Patented Sept. 3, 1940

2,213,194

UNITED STATES PATENT OFFICE 2,213,194

MANUFACTURE OF 1 - METHYL - 4 - HYDROXY-5-AMINO- AND 1 - METHYL - 4 - AMINO - 5 - HYDROXY-NAPHTHALENE-1¹-SULPHONIC ACID

Hans Lange and Otto Hoffmann, Dessau in Anhalt, Germany, assignors to General Aniline & Film Corporation, a corporation of Delaware No Drawing. Application October 25, 1939, Serial No. 301,158. In Germany November 15, 1938

6 Claims. (Cl. 260—509)

The present invention relates to the manufacture of 1-methyl-4-hydroxy-5-amino- and 1-methyl-4-amino-5-hydroxy-naphthalene-1¹ - sulphonic acid.

According to the present invention 1-methyl-4-hydroxy-5-amino- and 1-methyl-4-amino- 5-hydroxy-naphthalene-1¹-sulphonic acid of the formula:

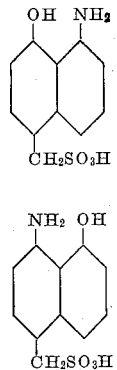

and respectively is obtained in an industrially simple manner and with a very good yield by causing strong nitric acid, preferably in the presence of an indifferent solvent, to act upon 1¹-chloro-1-methyl-5-nitronaphthalene, prepared, for instance according to U. S. A. Patent No. 2,133,389 by the reaction of formaldehyde and hydrochloric acid with 1-nitronaphthalene in the presence of a condensing agent, transforming the 1¹-chloro-1-methyl-4,5 - dinitronaphthalene obtained into the 1-methyl-4,5-dinitronaphthalene-1¹-sulphonic acid by a treatment with sodium sulphite, reducing the two nitro groups in known manner so as to obtain amino groups and boiling the diamino compound obtained, either directly or in the presence of acetone, with a solution of sodium bisulphite.

Literature references concerning the nitration of chloromethylated naphthalenes do not exist. It could not be foreseen how the chloromethyl group bound at the naphthalene nucleus would react when coming in contact with strong nitric acid. At the naphthalene nucleus the chloromethyl group is obviously more labile than at the benzene nucleus; this appears from the fact that para-nitrobenzyl chloride may be further nitrated by means of a mixture of nitric acid and sulphuric acid so as to obtain 2,4-dinitrobenzyl chloride, but the nitronaphthomethyl chloride cannot be further nitrated in this manner and is decomposed while splitting off hydrochloric acid.

It is surprising that, when treating 1¹-chloro-1-methyl-5-nitronaphthalene with strong nitric acid, preferably in the presence of a solvent such as carbon tetrachloride, the reaction may be conducted so that a uniform dinitro product is obtained with an excellent yield, the more so as a technically inseparable oily mixture of isomers is obtained when 1¹-chloro-1-methylnaphthalene is treated in the same manner.

The hitherto unknown 1¹-chloro-1-methyl-4,5-dinitronaphthalene obtained in an excellently pure state is transformed into the 1-methyl-4,5-dinitronaphthalene-1¹-sulphonic acid by treating it with sodium sulphite; this acid may readily be reduced so as to obtain the corresponding diamino compound which constitutes a valuable intermediate product for the manufacture of dyes. On boiling this amino acid with a solution of sodium bisulphite the 1-methyl-5-amino-4-hydroxynaphthalene-1¹-sulphonic acid is formed in the absence of acetone whereas in the presence of acetone the 1-methyl-4-amino-5-hydroxy-naphthalene-1¹-sulphonic acid is formed. These two aminohydroxy compounds obtained with a very good yield are likewise novel and valuable intermediate products for dyes.

It could not be foreseen or expected that the reaction of boiling an amino group so as to obtain a hydroxy-group according to Bucherer, known from genuine sulphonic acids, is industrially successful when applied for an omega-methane-sulphonic acid, as the latter does not at all behave as a sulphonic acid bound in the nucleus. Thus it is impossible, for instance, to transform the 1-methyl-4,5-diaminonaphthalene - 1¹ - sulphonic acid into the corresponding dihydroxy compound by boiling it with lime while applying pressure, this being possible without difficulties in the case of 1,8-naphthalene-diamine-4-sulphonic acid.

The following examples serve to illustrate the invention, but they are not intended to limit it thereto; the parts being by weight:

EXAMPLE 1

(a) *Manufacture of the 1-methyl-4,5-diaminonaphthalene-1¹-sulphonic acid.*

222 parts of 1¹-chloro-1-methyl-5-nitronaphthalene are introduced, while cooling, in the course of half an hour at a temperature not exceeding +10° C., into 400 parts of nitric acid of specific gravity 1.5; the product is dissolved. After a short time the dinitro compound begins to crystallize. The whole is further stirred for about half an hour and then poured, while stirring, into ice water. After 2 hours it is filtered with suction, washed until neutral and dried. There are obtained 262 parts of a crude product which when recrystallized from alcohol yields 189 parts (71 per cent. of the theory) of 1¹-chloro-1-methyl-4,5-dinitronaphthalene melting at 131° C.

133.3 parts of 1¹-chloro-1-methyl-4,5-dinitronaphthalene are boiled for 2 hours, while stirring, in a reflux condenser together with 75.5 parts of anhydrous sodium sulphite and 2000 parts of water. The solution is filtered with suction from small proportions of non-dissolved substances and the filtrate is reduced while 375 parts of iron and 125 parts of a 2N-solution of acetic acid are added. By acidification with hydrochloric acid the 1-methyl-4,5-diaminonaphthalene-1¹-sulphonic acid precipitates from the reduction solution in the form of a feebly green crystalline powder with a yield of 82 parts (65 per cent. of the theory).

(b) *Manufacture of the 1-methyl-4-hydroxy-5-aminonaphthalene-1¹-sulphonic acid*

126 parts of the 1-methyl-4,5-diaminonaphthalene-1¹-sulphonic acid obtained according to (a) are stirred for 3 hours at 90° C. with 500 parts of water and 1250 parts of a solution of sodium bisulphite of 38° Bé. After 1 hour the acid has dissolved to a clear solution. The solution is then acidified by means of 240 parts of concentrated sulphuric acid and the whole is boiled until all the sulphurous acid has disappeared. The solution is then neutralized by means of caustic soda solution, the sulphurous acid ester formed is decomposed by means of 370 parts of caustic lime and, after the gypsum has been filtered with suction, the 1-methyl-4-hydroxy-5-aminonaphthalene-1¹-sulphonic acid is precipitated by means of hydrochloric acid. There are obtained 91.5 parts, i. e. 72.6 per cent. of the theory.

(c) *Manufacture of the 1-methyl-4-amino-5-hydroxynaphthalene-1¹-sulphonic acid*

252 parts of 1-methyl-4,5-diaminonaphthalene-1¹-sulphonic acid are dissolved in 500 parts of water and 500 parts of a 2N-caustic soda solution. 60 parts of acetone and 2200 parts of a solution of sodium bisulphite of 38° Bé. are added. The whole is heated first for half an hour, while stirring, to 60 to 65° C. and then for 70 hours to 95 to 100° C. The product is worked up in the same manner as that of (a). On acidification with hydrochloric acid the 1-methyl-4-amino-5-hydroxynaphthalene-1¹-sulphonic acid precipitates in the form of a crystalline powder. There are obtained 204 parts, i. e. 80.6 per cent. of the theory.

*Example 2.*—221.5 parts of 1¹-chloro-1-methyl-5-nitronaphthalene are dissolved in 1000 parts of carbon tetrachloride. At a temperature not exceeding 10 to 15° C. 300 parts of nitric acid of a specific gravity of 1.5 are introduced drop by drop, while stirring and cooling, in the course of half an hour, the mixture is then further stirred for 1 hour at room temperature and then heated to 50° C., all the substances being dissolved thereby. After cooling the solution is poured on ice and filtered with suction; the product obtained is washed with water until neutral and dried at 100° C. There are obtained 247 parts, i. e. 92.6 per cent. of the theory, of 1¹-chloro-1-methyl-4,5-dinitronaphthalene melting at 130/131° C. When recrystallized from alcohol, the product melts at 134° C.

The further treatment so as to obtain the 1-methyl-4,5-dinitronaphthalene-1¹-sulphonic acid, the corresponding diamino compound and finally the two aminohydroxy compounds is the same as described in Example 1.

What we claim is:

1. The process which comprises acting upon 1¹-chloro-1-methyl-5-nitronaphthalene with concentrated nitric acid, boiling the 1¹-chloro-1-methyl-4,5-dinitronaphthalene with sodium sulphite in the presence of water to form 1-methyl-4,5-dinitronaphthalene-1¹-sulphonic acid, reducing the nitro groups, and treating the corresponding diamino compound thus obtained with an aqueous solution of sodium bisulphite.

2. The process which comprises acting upon 1¹-chloro-1-methyl-5-nitronaphthalene with concentrated nitric acid in the presence of carbon tetrachloride, boiling the 1¹-chloro-1-methyl-4,5-dinitronaphthalene with sodium sulphite in the presence of water to form 1-methyl-4,5-dinitronaphthalene-1¹-sulphonic acid, reducing the nitro groups, and treating the corresponding diamino compound thus obtained with an aqueous solution of sodium bisulphite.

3. The process which comprises acting upon 1¹-chloro-1-methyl-5-nitronaphthalene with concentrated nitric acid, boiling the 1¹-chloro-1-methyl-4,5-dinitronaphthalene with sodium sulphite in the presence of water to form 1-methyl-4,5-dinitronaphthalene-1¹-sulphonic acid, reducing the nitro groups, and treating the corresponding diamino compound thus obtained with an aqueous solution of sodium bisulphite in the presence of acetone.

4. The aminohydroxynaphthalenemethylsulphonic acids of the general formula

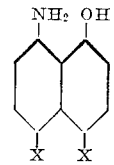

wherein one X means hydrogen and the other is —CH₂SO₃H.

5. 1-methyl-4-hydroxy-5-aminonaphthalene-1¹-sulphonic acid of the formula

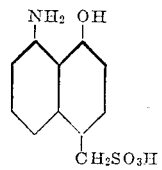

6. 1-methyl-4-amino-5-hydroxynaphthalene-1¹-sulphonic acid of the formula

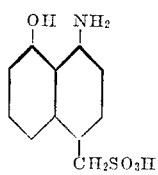

HANS LANGE.
OTTO HOFFMANN.